Aug. 22, 1950     E. J. MERRELL     2,520,046
BONDING TEAM FOR PROTECTION AGAINST LEAD
SHEATH CORROSION
Filed Oct. 5, 1945
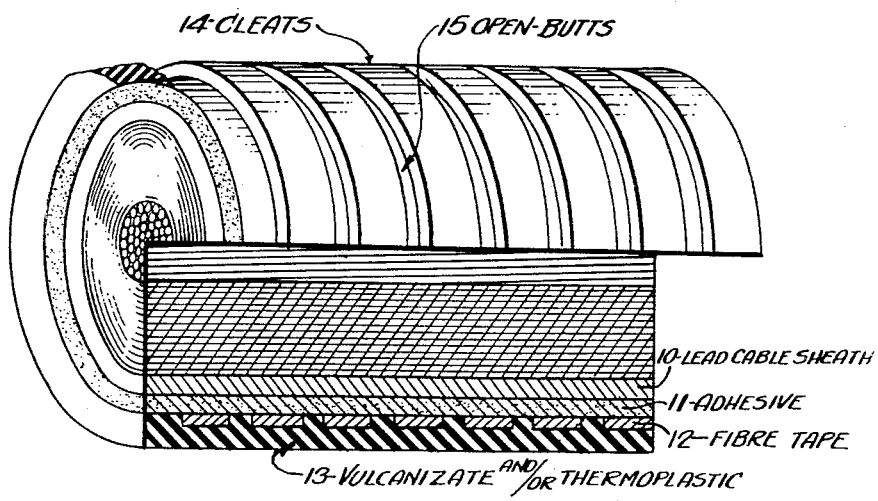
INVENTOR
EDWIN J. MERRELL
BY
ATTORNEY Patented Aug. 22, 1950

2,520,046

UNITED STATES PATENT OFFICE 2,520,046

BONDING TEAM FOR PROTECTION AGAINST LEAD SHEATH CORROSION

Edwin J. Merrell, Eastchester, N. Y., assignor to Phelps Dodge Copper Products Corporation, Dover, Del., a corporation of Delaware Application October 5, 1945, Serial No. 620,587

1 Claim. (Cl. 154—2.28)

This invention relates to the protection of lead sheath of electric cables against corrosion and has for its object to present a bonding team employed to attach a corrosion protection to the lead sheath.

Protection of metal structures, such as the lead sheath of an electric cable, against corrosion induced by electrolysis and corrosive soil elements has been an economic necessity in many locations, despite the considerable added increment in cost entailed by conventional protection methods. However, in many more instances it would have been used to effect a conservation of materials and a continuity of service, were it not for the relatively prohibitive cost of these conventional methods of protection, not only for material, but also in trained personnel. Furthermore, the exploitation of thermoplastics in this field has been handicapped, despite their highly efficient characteristics in this respect, because no mutual bonding agent has been available which would maintain its bonding characteristic during many conditions encountered in normal usage, such as the bending and abrasion which occur when drawing cable into concrete duct systems.

I have discovered a method of overcoming this lack of a mutual agent for bonding thermoplastics to metal, which also may be applied to the bonding of other corrosion protections, for example, vulcanizates, to metal.

My invention consists essentially of a novel bonding team which is employed to attach the corrosion protection to the metal; and, furthermore, the elements of this bonding team lend necessary physical support to the protection layer. The bonding team is a combination of adhesive and fibre, the adhesive functioning as a bond between the metal and the layer of fibre, and the layer of fibre as a joining mechanism between adhesive and protection layer. The protection layer is placed over the fibre layer, and is applied in a manner such as to force it into the fibre, forming thereby a mechanical bond therewith. Not only in this way is the protection layer bonded to the lead sheath, but also in turn the manner of bonding via a fibre layer offers a most efficient physical support of the protection layer; thus, the supporting element, being concentrated at the inside surface of the protective element, permits the maximum elastic movement of the protection which is important to the prevention of damage, for example, during electric cable laying operations, and in turn the fibre layer is protected from physical and chemical damage by virtue of its totally enclosed position.

The adhesive employed is preferably quick setting to permit maximum production speeds. It should retain a considerable degree of elasticity when set, so as to accommodate the bending met in manufacturing and installation procedures.

The fibre layer must be characterized by relatively high porosity and flexibility, and by a moderate degree of elasticity.

While the corrosion protection layer may be either a vulcanizate or a thermoplastic, or combinations of either or both, depending upon the character of protection required, I prefer the thermoplastic, polyethylene, because of its stable characteristics with respect to time and because of its self-lubricating property. The vinyl plastics also are useful in this construction because of their oil resistance.

Where considerable waste heat energy is available, as directly after extrusion of lead sheath, hot melt adhesives, solvent type adhesives, or adhesive emulsions may be used efficiently, the waste heat driving off the solvent. When this arrangement is not feasible, polymerizing adhesives or self-curing adhesives should be used. In some instances pressure sensitive adhesives are applicable. Examples of these different types of adhesives are: hot melt, a stearin pitch; solvent, a Buna N dissolved in ethylene dichloride; emulsion, a water suspended latex; polymerizing, a plasticized mixture of monomeric and polymeric styrene; self-curing, a rubber cement to which accelerators and curing agents are added just before use; pressure sensitive, a plasticized crude rubber.

My invention is illustrated in the figure, which is a typical cross section through the bond shown in relation to the cable, in which 10 is the lead sheath, 11 the adhesive layer, 12 the fibre layer, butt wrapped, 13 the protection layer, 14 the cleats formed in the butt spaces by forcing the protection layer into the fibre layer and 15 open-butts.

Application of the fibre layer by taping is particularly advantageous, mechanically, since it provides additional longitudinal support for the corrosion protection layer due to the interlocking or cleated joint which results. Open-butt taping is preferred over lapped taping because the cleat is effective in two directions of pull, whereas that obtained in the lapped construction is effective in only one direction. Open-butt taping is the method, commonly understood in the industry, of applying tape so that a space is left between the successive turns of the tape. The fibre layer may be wood pulp paper, cotton cloth, asbestos cloth, or similar fibrous materials. Kraft paper is preferred over other materials from a cost viewpoint, and unsized crinkled kraft is preferred over straight run paper because of its built-in elasticity.

The corrosion protection layer can be applied by taping, stripping, or by extrusion.

While application of the protection layer in tape form under tension provides sufficient mechanical bond for some uses, in general, when taping or stripping, some auxiliary means of forcing the protection layer material into the fibre layer may be necessary; for example, formed rolls may be used to compress the protection layer into the fibre layer, or the structure may be processed through an elevated-temperature high-pressure vessel. The latter means is ideally suited to vulcanizates, which may be cured in the same operation.

Sufficient pressures are developed in standard extrusion methods to effect the penetration of the protection layer compound into the fibre layer, no auxiliary aids being required to enhance the combination. In self-centering die extrusion methods, however, auxiliary vacuum in the cone sometimes may be necessary to obtain effective penetration.

The foregoing and other features of my invention will now be described in connection with the accompanying drawing forming part of this specification in which I have illustrated my protection method in its preferred form, after which I shall point out in the claim those features which I believe to be new and of my own invention.

I wish it distinctly understood that my protection method against lead sheath corrosion herein described and illustrated is in the form in which I desire to practice it and that changes or variations may be made as may be convenient or desirable without departing from the salient features of my invention and I therefore intend the following claim to cover such modifications as naturally fall within the lines of invention.

I claim:

A bonding team to achieve corrosion protection of a metal cable sheath, consisting of an adhesive applied to the metal, an open butt taped fiber layer of kraft paper tape of relatively high porosity and flexibility bonded to the metal by the adhesive, and a single flexible layer of thermoplastic polyethylene extruded over all, the shrinkage of the outer surface of the polyethylene, as it cools after leaving the extrusion die, compressing the inner high temperature plastic part of the layer into the open butt spaces, thereby bonding the polyethylene corrosion protection to the sheath longitudinally by the cleated joint which results.

EDWIN J. MERRELL.

REFERENCES CITED

The following references are of record in the file of this patent:

UNITED STATES PATENTS

| Number | Name | Date |
| --- | --- | --- |
| 1,610,910 | Williams | Dec. 14, 1926 |
| 1,959,526 | Del Mar | May 22, 1934 |
| 2,161,036 | Gremmel et al. | June 6, 1939 |
| 2,278,345 | Benson | Mar. 31, 1942 |
| 2,316,293 | Scott | Apr. 13, 1943 |
| 2,367,173 | Martin | Jan. 9, 1945 |
| 2,374,067 | Alderson, Jr. | Apr. 17, 1945 |
| 2,374,121 | Myles et al. | Apr. 17, 1945 |
| 2,427,507 | Powell, 3rd, et al. | Sept. 16, 1947 |
| 2,436,421 | Cork | Feb. 24, 1948 |

FOREIGN PATENTS

| Number | Country | Date |
| --- | --- | --- |
| 171,369 | Great Britain | Sept. 7, 1922 |

OTHER REFERENCES

Industrial and Engineering Chemistry, June 1945, pp. 526–533, "Polyethylene, Physical and Chemical Properties," Hahn, Macht, and Fletcher.

Vinylite Plastics Bulletin, Wire and Cable Insulation, Bakelite Corp., New York, N. Y., 1945.